United States Patent [19]

Garnett

[11] 4,325,473
[45] Apr. 20, 1982

[54] BEARING ASSEMBLIES FOR USE IN CONVEYOR ROLLER

[76] Inventor: David M. Garnett, Thorpe Arch Trading Estate, Wetherby, Yorkshire, England, LS23 7BL

[21] Appl. No.: 107,201

[22] Filed: Dec. 26, 1979

[30] Foreign Application Priority Data

Sep. 8, 1979 [GB] United Kingdom ............ 31238/79

[51] Int. Cl.³ .......................................... B65G 13/00
[52] U.S. Cl. .................................. 193/35 R; 308/20
[58] Field of Search ............... 193/35 R, 35 S, 37; 308/20, 176, 18, 184 R, 187.1; 301/5.7; 29/110, 116 R; 198/780

[56] References Cited

U.S. PATENT DOCUMENTS 1,362,910 12/1920 Zoeller et al. .............. 308/20 X
1,746,068 2/1930 Barnes ........................ 308/187.1

Primary Examiner—Robert B. Reeves
Assistant Examiner—Gene A. Church
Attorney, Agent, or Firm—David A. Jackson

[57] ABSTRACT

The invention provides a bearing assembly for a conveyor roller comprising a roller bearing comprising an inner race and an outer race. The outer race is for engagement in the end of a sleeve body while the inner race receives a stub axle. A blanking plate of the outer race seals off the interior of the sleeve body on a spring acts between the blanking plate and the stub axle so that the stub axle which serves to support the roller in a frame member can be deflected against the spring towards the blanking plate to enable the roller to be released from the frame member.

5 Claims, 3 Drawing Figures

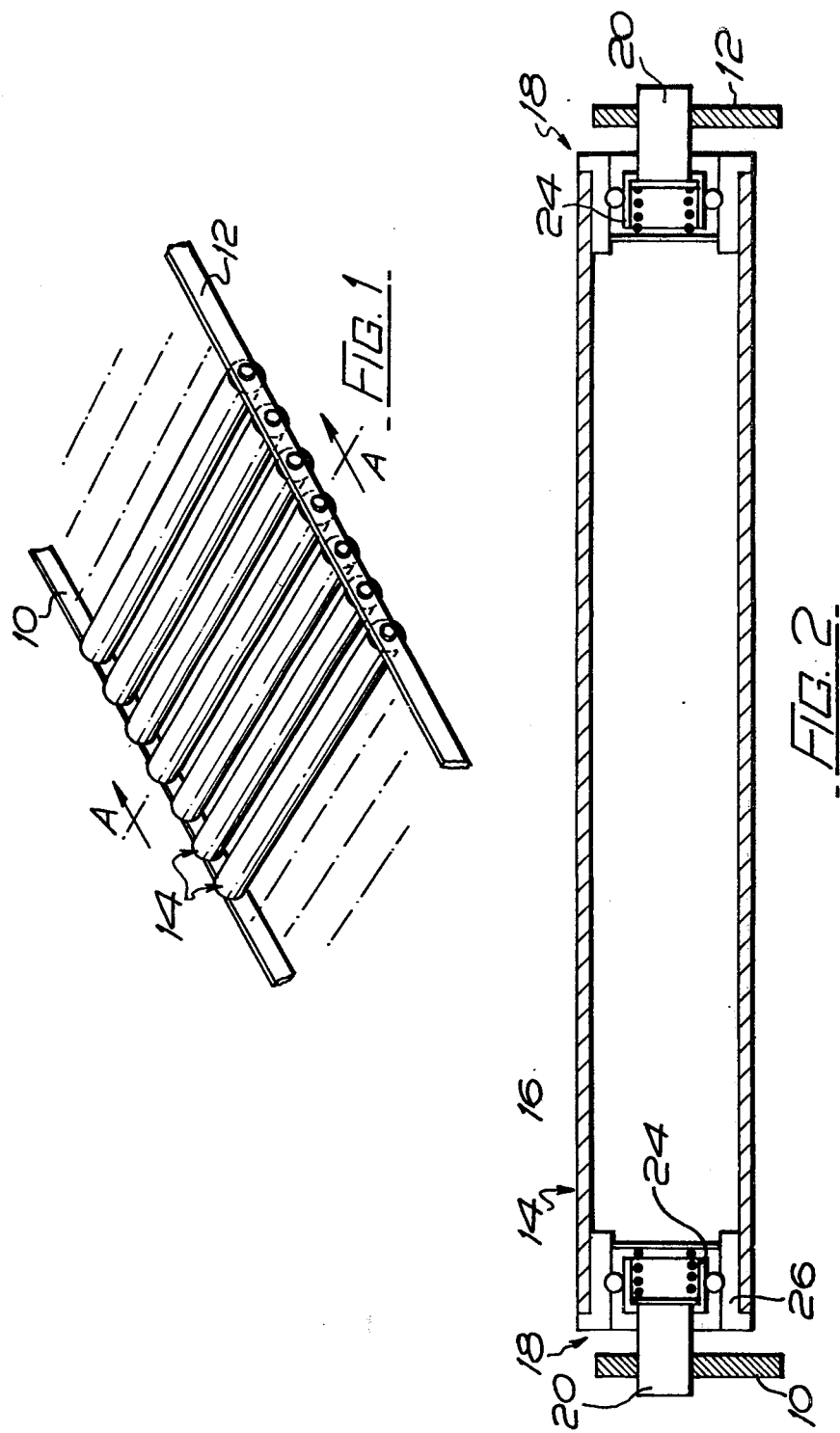

BEARING ASSEMBLIES FOR USE IN CONVEYOR ROLLER

This invention relates to bearing assemblies for use in conveyor rollers for roller conveyors.

Conveyor rollers are used extensively in industry when it is desired to provide a roller conveyor transportation system for products, boxes or the like extending for example between locations in a factory or from a despatch location to a location from which goods to be shipped can be loaded in to a transportation vehicle. The rollers in fact combine to define the transportation surface or decking and these conveyor roller systems can be used for the transportation of large and small articles and objects alike, although we are primarily concerned with conveyor roller systems for the transportation of manually handleable items such as frozen chickens, loafs of bread, or boxes of articles such as tins of beans, and so on.

A conveyor roller for a roller conveyor essentially is a relatively simple article and comprises normally a sleeve body in the ends of which are located bearing assemblies. Means defining a spindle supported by a surrounding frame engages in the bearing assemblies whereby the sleeve body is free to rotate relative to the axis defined by the spindle means.

Although these rollers essentially are simple in nature, not much attention has been given to their design, and in fact the bearing assemblies which are still extensively used throughout the world are somewhat primitive and inefficient. For example, it is known to provide bearing assemblies which are simply plastic or wooden blocks, the spindle means locating directly in a bore in the wooden block or plastic block in sliding relationship therewith. Other known arrangements use roller bearings in the bearing assemblies, but these roller bearings traditionally have been constructed of steel but such bearings have been and are liable to corrosion, as frequently the conveyor rollers must work in corrosive environments, at the very least where water and air are present, which gives rise to rusting of the bearings and their eventual siezure or dramatic reduction in their efficiency. It is imperative that the conveyor rollers be extremely free running, especially where they are used in gravity roller conveyor systems in which the decking is inclined, and the goods move along the roller decking by virtue of gravity. The discussed prior art roller systems have not been directed to the needs of and problems associated with conveyor roller systems.

Furthermore, in conveyor systems the demand for the bearings of each roller to be high accuracy machine components is not as great as in other engineering applications and consequently I have in fact devised bearing assemblies for conveyor rollers which are constructed from plastics material, and I have found that the tolerences can be reasonably generous compared with precision made steel roller bearings, without any deleterious effect on the operation of the bearings, and indeed in some case the generous tolerences enhance the operation of the roller as they make it run freer.

The ability of the roller to run freely is in fact of prime importance in a conveyor roller system, and care must be taken to ensure that the bearing assemblies at the ends of the sleeve body are not loaded axially one relative to the other, either when the roller is assembled or when it is placed in position in the conveyor system frame. Considering firstly the conveyor system frame mounting, if the roller bearing is wedged into the frame, and the bearing assemblies at the ends of the sleeve body are roller bearings having inner and outer races, if the frame for example bears upon the inner races of the end bearings and urges them axially together, there will be a loading axially of the roller on the rolling elements on the bearings, preventing free-running of the roller bearing assembly on the rolling elements. Equally, if the spindle means is a long spindle which extends through the end bearings, if the fit between the spindle means and the inner races, for example, is so much of an interference fit that insertion of the spindle means requires considerable effort, this can in fact impose a similar type of axial loading on the inner races, and hence on the rolling elements with the result that optimum free running of the sleeve body is not achieved. It is desirable in fact that when the roller is fitted in the roller transport system, the sleeve body should be capable of a limited degree of free axial movement relative to the spindle means. This is provided by ensuring that the bearing assemblies are a sliding fit on the spindle, means being provided to ensure that the degree of sliding of the bearings on the spindle means is limited.

Because these systems are being used to a much greater extent in the food industry, much attention has been given to whether or not the use of these conveyor rollers, in all of their forms, gives rise to any hygiene problems. In fact they do give hygiene problems in that water (and other liquids), for example used for the washing down of the system, or dropping from the products carried by the system, tends to collect inside the sleeve bodies wherein it remains undetected, and from which it does not evaporate rapidly, leading in the final analysis to bacterial growth which is totally unacceptable in a food factory. I have given considerable effort and thought to the overcoming of the problem of the ingress of water into the sleeve body in order to overcome the hygiene problems associated with the roller transport systems of the type in which the invention can be applied, and my invention is concerned with the provision of a bearing assembly for a sleeve body of a conveyor roller of a transport system, not only by which the aforesaid problem concerning the ingress of liquid can be avoided, or substantially eliminated but also so that the roller can be easily removed from the supporting frame.

In accordance with the invention, a bearing assembly for a conveyor roller comprises a roller bearing having an inner race and an outer race of which one is adapted to be in operative connection with a sleeve body, whilst the other is in operative connection with a spindle means in the form of a stub shaft which projects from the bearing for engagement in a supporting frame member, there is a blanking panel which is connected to or integral with the race which receives the sleeve body to blank off the roller elements from the interior of the sleeve body to prevent inflow of water into said sleeve body, the said spindle being spring loaded away from the blanking panel but deflectible towards same against spring action.

By means of the invention, the stub spindles can be deflected against spring action to enable the positioning of same in and the removal of same from the conveyor frame quickly and easily.

Also, according to the invention there is provided a conveyor roller for a roller conveyor said roller comprising a sleeve body in the ends of which are received bearing assemblies each comprising a roller bearing having an inner race and an outer race of which one receives the sleeve body, whilst the other is in operative connection with a spindle means in the form of a stub shaft which projects from the bearing for engagement in a supporting panel member, there is a blanking panel which is connected to or integral with the race which receives the sleeve body to blank off the roller elements from the interior of the sleeve body to prevent inflow of water into said sleeve body, the said spindle being spring loaded away from the blanking panel but deflectible towards same against spring action.

The invention can be applied to driven rollers as well as gravity rollers.

An embodiment of the present invention will now be described, by way of example, with reference to the accompanying drawings, wherein:

FIG. 1 is a perspective view of a part of a roller conveyor transport system;

FIG. 2 is a sectional elevation, taken on the line A—A in FIG. 1 showing detail of a roller of which several are shown in FIG. 1, FIG. 2 being diagrammatic in the bearing assembly constructional details.

Figure 3:
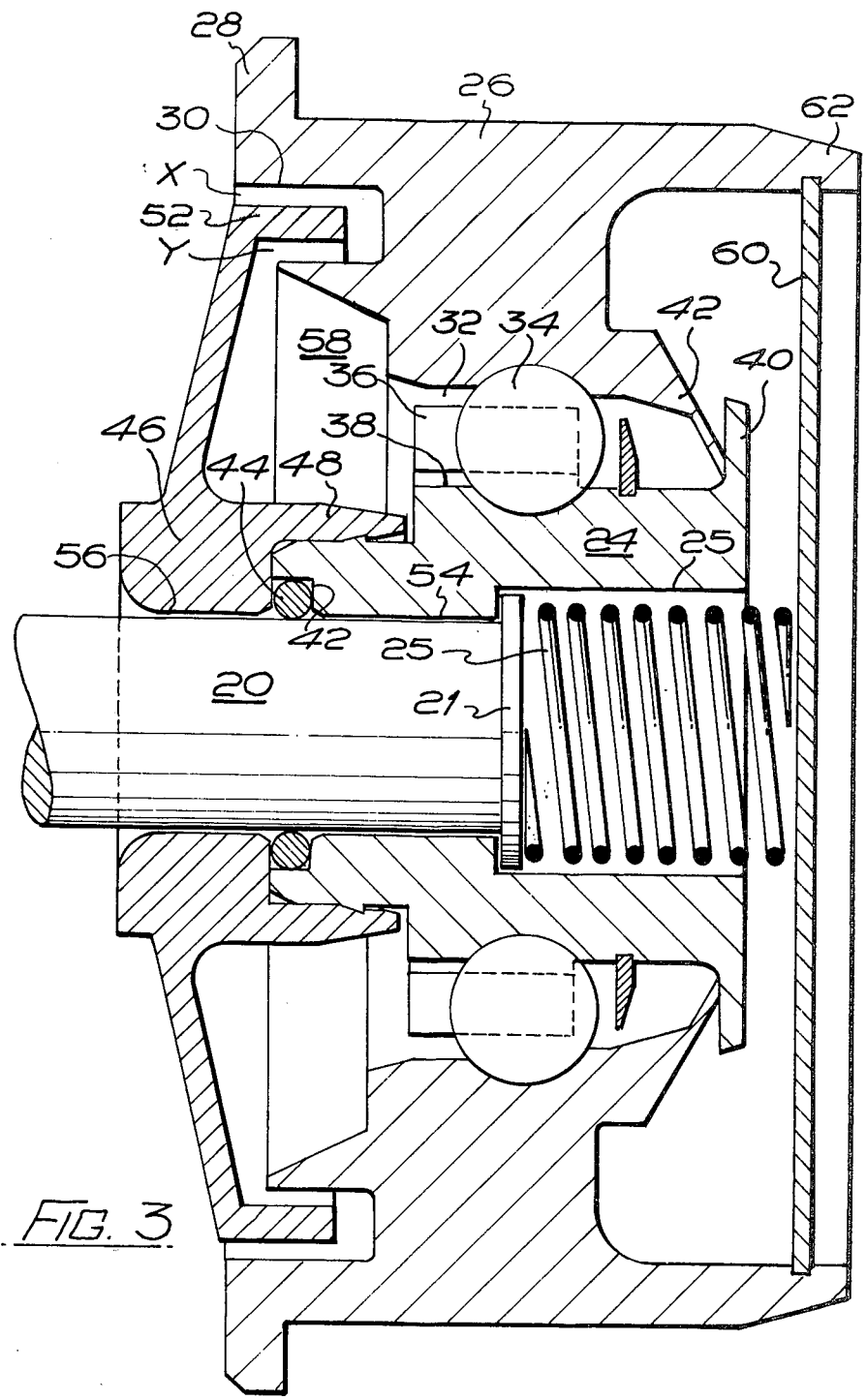
FIG. 3 is a sectional elevation showing a bearing assembly in accordance with the invention, and for use in the roller illustrated in FIG. 2.

Referring to the drawings, in FIG. 1 there is shown a section of a simple roller conveyor transport system comprising a pair of parallel side frame members or bars 10, 12 between which extend, in parallel fashion the conveyor rollers 14. It should be mentioned that the arrangement illustrated is an extremely simple version of a roller conveyor transport system, and it has been illustrated in simplified fashion for the purpose of explanation. In practice these systems tend to be much more complicated in having curves, parallel rows of rollers, and so on. The present invention is however concerned with the bearing structure, and not with the particular conveyor layout.

Each of the rollers 14 is diagrammatically indicated in FIG. 2, and will be seen to comprise a sleeve body 16 in the ends of which are press fitted bearing assemblies 18. The bearing assemblies include stub spindles 20 by which the roller is supported in the frame members 10 and 12, the spindles 20 being in fact slidable in apertures in said frame members 10, 12 as will be explained.

Each of the bearing assemblies 18 is shown in FIG. 2 to comprise an inner race 24 engaged by and slidably locating the spindle 20 and an outer race 26 over which the sleeve body 16 is frictionally engaged. In FIG. 2, the bearing assemblies are shown in much simplified form, but FIG. 3 shows in detail the construction of the bearing assembly 18 located at the left hand of the roller shown in FIG. 2. The bearing 18 at the right hand of the roller is of identical construction.

Referring now to FIG. 3, the bearing assembly 18 is shown in detail, and it will be seen that the outer bearing race 26 is provided with a flange 28 against which the sleeve body 16 can abut when it is friction fitted thereon. Additionally, toward the outside of the bearing, the outer race 26 is provided with a labyrinth cavity 30. An outer race bearing surface 32 is engaged by the ball rolling elements 34 of the bearing assembly, said bearing elements 34 being held in correct spaced disposition by means of a cage 36.

The inner race 24 is provided with a ball race surface 38 which is engaged by the said balls 34, and is also provided at its inner end with an outwardly directed flange 40 which is engaged by a conical lip seal 42 formed integrally in the outer race 26.

At its outer end, the inner race 24 is provided with a shoulder 43 in which is engaged a rubber O-ring seal 44, the seal 44 being prevented from falling from the bearing assembly by means of an end cap 46. The end cap 46 has an inwardly projecting ring 48 which snaps over a locating ring of the inner race, the engagement being retained by means of the conical projecting ring 50 on the inner race engaging a corresponding groove on the inner surface of ring 48.

The cap 46 has a labyrinth seal ring 52 which lies in the labyrinth groove 30 of the outer race with clearance of particular dimensions as will be explained.

It will be noticed that the inner race 24 has a bore 54 of a suitable size to receive the spindle 20, and also the cap 46 has a bore 56 which is identical in size to and co-axial with the bore 54, so that the spindle can pass through the bearing assembly. It is to be mentioned that the O-ring seal 44 has an inner diameter which is slightly less than the common bore 56/54, and the spindle 20 is adapted to be received in the common bore 56/54 with clearance, so that in actual fact the seal between the spindle 20 and the bearing assembly along the bore 56/54, is in fact by contact between the O-ring seal 44 and the spindle 20 and not between the bore surfaces 56/54 and the spindle 20. This constitutes a significant departure in construction in a bearing assembly of this type and also enables the bearing assembly to have the necessary axial freedom to float on the spindle as referred to herein, which is important for the prevention of a preloading of the respective bearings 18 in a roller, which gives rise to friction running of the outer sleeve body 16. It will be noted that there is in fact no relative rotation between the spindle 20 and the inner race 24 and its end cap 46, and therefore the seal 44 should provide an effective means for preventing the ingress of water into the sleeve body along the spindle 20.

The labyrinth gap has been referred to herein, and by this gap is meant the dimension such as dimension X or dimension Y between the relatively rotating surfaces of the labyrinth groove 30 and the labyrinth ring 52. It is also important that the labyrinth diameter be greater than the pitch circle diameter of the balls 38 for a purpose which will be clear from the following.

The bearing assembly is in use located in the disposition shown in FIG. 3, and when liquid falls in the bearing assembly or is sprayed thereonto for the purposes of washing same, the liquid will flow into the bearing assembly through the gaps X and Y, and will tend to fill the interior of the bearing assembly for example in cavity 58, and around the balls and ball cage, and finally in the vicinity of the seal 42 and the flange 40. The liquid would accumulate were it not for the fact that the dimensions X and Y which although shown at the top of the bearing assembly of course also exist at the bottom of the bearing assembly as the components are rotary, and these clearances are designed such as to allow the liquid to run out of the bearing assembly. The unit is therefore designed to resist ingress of water and other liquids, but is not made so narrow that the egress of water out of the bottom of the bearing through the same labyrinth gaps is prevented. From a practical point of view, we have achieved excellent results in the case where the diameter of the labyrinth ring 52 is of the order of 47 mm where the X and Y spacing are made of the order of 2 mm, and preferably in the range 1.7 to 2.3 mm.

In addition however, the outer race 26 is provided with a blanking disc 60 which fits into a projection 62 of the outer race 26 as shown, effectively to blank and seal off the interior of the sleeve body 16 from the ingress of water. The blanking disc may be defined by a separate cap or it may be made integral with the outer race. With appropriate modifications, where the inner race supports the sleeve body 16, the blanking plate may be associated with the inner race.

It will be seen that the spindle 20 has an inner end flange 21 of larger diameter than bore 56/54 and the flange lies in an enlarged bore section 25 of inner race 24, with clearance. A compression spring 61 acts between the disc 60 and the flange 21 to urge the stub axle 20 away from the disc 60, but not so as to load the inner and outer races together. The stub axle can be displaced readily and easily against the spring 61 for the release of same from the frame member 10, to remove the roller from the frame, which need only be provided with holes for receiving the spindles 20.

The bearing assemblies described are for plugging into the ends of bearing sleeves, but it is appreciated that this invention could well be applicable in other applications. The bearing assembly can be made cheaply when the parts are moulded from plastics material as described, and assembly of the roller is facilitated by the fact that the spindle 20 sealingly engages only on the O-ring seal 44.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. A bearing assembly for a conveyor roller comprising a rolling bearing having an inner race and an outer race of which one is adapted to be in operative connection with a sleeve body, whilst the other is in operative connection with a spindle means in the form of a stub shaft which projects from the bearing for engagement in a supporting panel member but is prevented from moving out of the bearing in the direction in which it projects from the bearing by means of a shoulder and stop arrangement, and a blanking panel which rotates with the race which receives the sleeve body to blank off the roller elements from the interior of the sleeve body to prevent inflow of water into said sleeve body, the said spindle being spring loaded in the direction in which it projects from the bearing which is away from the blanking panel but is deflectible towards the blanking panel against spring action.

2. A bearing assembly according to claim 1, wherein the outer race is adapted to be received in the sleeve body, and the stub shaft is received with clearance in a bore in the inner race, and a flexible seal received in a recess in the inner race engages the stub shaft to form a seal therewith but to enable the shaft to slide relative to the inner race.

3. A bearing assembly according to claim 2, wherein the seal in an O-ring held in position by a cap snap fitted to the inner race.

4. A conveyor roller for a roller conveyor, said roller comprising a sleeve body in the ends of which are received bearing assemblies each comprising a roller bearing having an inner race and an outer race of which one receives the sleeve body, whilst the other is in operative connection with a spindle means in the form of a stub shaft which projects from the bearing for engagement in a supporting frame member, but is prevented from moving out of the bearing in the direction in which it projects from the bearing by means of a shoulder and stop arrangement, and a blanking panel which rotates with the race which receives the sleeve body to blank off the roller elements from the interior of the sleeve body to prevent inflow of water into said sleeve body, the said spindle being spring loaded in the direction in which it projects from the bearing which is away from the blanking panel but is deflectible towards the blanking panel against spring action.

5. A roller conveyor comprising spaced frame members, a plurality of conveyor rollers extending between and removably supported by said frame members, each roller comprising a sleeve body of which the ends receive roller bearings, each roller bearing having an inner race and an outer race of which one receives the sleeve body, whilst the other is in operative connection with a spindle means in the form of a stub shaft which projects from the bearing and is slidably received in the adjacent one of said frame members but is prevented from moving out of the bearing in the direction in which it projects from the bearing by means of a shoulder and stop arrangement, and a blanking panel which rotates with the race which receives the sleeve body to blank off the roller elements from the interior of the sleeve body to prevent inflow of water into said sleeve body, the said spindle being spring loaded in the direction in which it projects from the bearing which is away from the blanking panel but is deflectible towards the blanking panel against spring action, so that the stub shaft can be removed from slidable engagement with the frame member.

* * * * *